United States Patent
Åström et al.

(10) Patent No.: US 12,082,148 B2
(45) Date of Patent: Sep. 3, 2024

(54) WIRELESS COMMUNICATION DEVICE, RADIO ACCESS NETWORK NODE, METHODS, AND COMPUTER PROGRAMS FOR POWER EFFICIENT PAGING ESCALATION

(71) Applicant: Telefonaktiebolaget LM Ericsson (publ), Stockholm (SE)

(72) Inventors: Magnus Åström, Lund (SE); Andreas Höglund, Solna (SE); Olof Liberg, Enskede (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 430 days.

(21) Appl. No.: 17/427,510

(22) PCT Filed: Feb. 14, 2020

(86) PCT No.: PCT/EP2020/053832
§ 371 (c)(1),
(2) Date: Jul. 30, 2021

(87) PCT Pub. No.: WO2020/165384
PCT Pub. Date: Aug. 20, 2020

(65) Prior Publication Data
US 2022/0141798 A1 May 5, 2022

Related U.S. Application Data (60) Provisional application No. 62/805,619, filed on Feb. 14, 2019.

(51) Int. Cl.
*H04W 68/00* (2009.01)
*H04W 56/00* (2009.01)

(52) U.S. Cl.
CPC ....... *H04W 68/005* (2013.01); *H04W 56/001* (2013.01)

(58) Field of Classification Search
CPC ........... H04W 52/0235; H04W 56/001; H04W 68/005; Y02D 30/70
See application file for complete search history.

(56) References Cited

U.S. PATENT DOCUMENTS

| 9,883,482 B2 | 1/2018 | Johansson et al. |
| 11,089,548 B2 | 8/2021 | Qu et al. |

(Continued)

FOREIGN PATENT DOCUMENTS

| CN | 103858513 A | 6/2014 |
| EP | 3232720 A1 | 10/2017 |

(Continued)

OTHER PUBLICATIONS

Japanese Office Action and English Translation dated Sep. 27, 2022 for Patent Application No. 2021-546696, consisting of 9 pages.

(Continued)

*Primary Examiner* — Nader Bolourchi
(74) *Attorney, Agent, or Firm* — Weisberg I.P. Law, P.A.

(57) ABSTRACT

A wireless communication device includes a receiver arranged to receive radio signals from a radio access network node of the cellular communication system, and a signal detector arranged to detect a first signal and a second signal among the signals received from the access network node. The first signal includes a network synchronisation signal having information about synchronisation and an identification of a cell associated with the access network node. The second signal includes a notification. A controller causes the signal detector to detect a notification of a first type when the received identification of the cell is equal to a previous reception of an identification of a cell at a last (Continued)

interaction between the wireless communication device and the cellular communication system or detect a notification of a second type when the received identification of the cell differs from the previous reception of the identification of the cell at the last interaction.

28 Claims, 4 Drawing Sheets

(56) References Cited

U.S. PATENT DOCUMENTS

| | | |
|---|---|---|
| 2014/0355595 A1 | 12/2014 | Curtiss et al. |
| 2015/0141062 A1 | 5/2015 | Ostrup et al. |
| 2015/0173122 A1 | 6/2015 | Schliwa-Bertling et al. |
| 2016/0295529 A1 | 10/2016 | Rico Alvarino et al. |
| 2018/0249441 A1 | 8/2018 | Ryoo et al. |
| 2018/0324722 A1 | 11/2018 | Vos et al. |
| 2018/0331875 A1 | 11/2018 | Abedini et al. |
| 2019/0223149 A1 | 7/2019 | Tseng et al. |
| 2019/0319666 A1 | 10/2019 | Alriksson et al. |
| 2020/0267651 A1 | 8/2020 | Wilhelmsson et al. |
| 2020/0280479 A1 | 9/2020 | Wilhelmsson et al. |
| 2020/0367195 A1 | 11/2020 | Selvaganapathy et al. |
| 2021/0168747 A1 | 6/2021 | Wong et al. |
| 2022/0078879 A1 | 3/2022 | Nimbalker et al. |
| 2022/0104170 A1 | 3/2022 | Liberg et al. |
| 2022/0141798 A1 | 5/2022 | Astrom et al. |
| 2023/0076100 A1 | 3/2023 | Maleki et al. |
| 2023/0276362 A1 | 8/2023 | Reial et al. |
| 2023/0354198 A1 | 11/2023 | Nader et al. |

FOREIGN PATENT DOCUMENTS

| | | |
|---|---|---|
| JP | 2018500850 A | 1/2018 |
| KR | 20140046071 A | 4/2014 |
| WO | 2011073722 A1 | 6/2011 |
| WO | 2013113988 A1 | 8/2013 |
| WO | 2015185169 A1 | 12/2015 |
| WO | 2016160290 A1 | 10/2016 |
| WO | 2018174635 A1 | 9/2018 |

OTHER PUBLICATIONS

Japanese Office Action and English Translation dated Sep. 27, 2022 for Patent Application No. 2021-546695, consisting of 8 pages.
3GPP TSG-RAN WG1 Meeting #92bis R1-1805854; Title: Wake-up signal functions for NB-IoT; Agenda Item: 6.2.7.1.1.1; Source: Ericsson; Document for: Discussion and Decision; Location and Date: Busan, Korea May 20-24, 2018, consisting of 7 pages.
3GPP TSG-RAN WG1 Meeting #93 R1-1805995; Title: Wake-up Signal Functions for NB-IoT; Agenda Item: 6.2.7.1.1.1; Source: MediaTek Inc.; Document for: Discussion and Decision; Location and Date: Busan, South Korea May 21-25, 2018, consisting of 5 pages.
Korean Notice of Allowance and English machine summary dated Aug. 10, 2023 for Application No. 2021-7024855, consisting of 8 pages.
3GPP TSG RAN WG2 NB-Meeting #95bis R2-166732; Title: UE specific Paging area definition; Agenda Item: 8.9.4; Source: Sony; Document for: Discussion/decision; Location and Date: Kaoshing, Taiwan, Oct. 10-14, 2016, consisting of 3 pages.
Korean Notice of Preliminary Rejection and English Summary dated Feb. 9, 2023 for Application No. 2021-7024855, consisting of 9 pages.
European Communication and Search Report dated Feb. 22, 2023, for Application No. 22206009.7, consisting of 8 pages.
International Search Report and Written Opinion dated May 12, 2020 for International Application No. PCT/EP2020/053832 filed Feb. 14, 2020, consisting of 9 pages.
International Search Report and Written Opinion dated May 20, 2020 for International Application No. PCT/EP2020/053833 filed Feb. 14, 2020, consisting of 10 pages.
3GPP TS 36.304 V15.4.0; 3rd Generation Partnership Project; Technical Specification Group Radio Access Network; Evolved Universal Terrestrial Radio Access (E-UTRA); User Equipment (UE) procedures in idle mode (Release 15); Jun. 2019, consisting of 55 pages.
3GPP TS 38.304 V15.4.0; 3rd Generation Partnership Project; Technical Specification Group Radio Access Network; NR; User Equipment (UE) procedures in Idle mode and RRC Inactive state (Release 15); Jun. 2019; consisting of 29 pages.
3GPP TSG-RAN WG1 Meeting #95 R1-1812119; Title: UE-group wake-up signal in LTE-MTC; Agenda Item: 6.2.1.1; Document for: Discussion, Decision; Source: Ericsson; Date and Location: Nov. 12-16, 2018, Spokane, USA; consisting of 11 pages.
3GPP TSG RAN WG1 Meeting #95 R1-1812454; Title: UE-group wake-up signal for eMTC; Agenda Item: 6.2.1.1; Document for: Discussion and Decision; Source: Intel Corporation; Date and Location: Nov. 12-16, 2018 Spokane, USA; consisting of 5 pages.
3GPP TSG-RAN WG2 Meeting #104 R2-1817048; Title: Analysis of Group WUS Options; Agenda Item: 12.2.3; Document for: Discussion and Decision; Source: Nokia, Nokia Shanghai Bell; Date and Location: Nov. 12-16, 2018, Spokane, USA; consisting of 5 pages.
3GPP TSG RAN WG1 Meeting #92bis R1-1804186; Title: Wake up signal function for NB-IoT; Agenda Item: 6.2.7.1.1.1; Document for: Discussion and Decision; Source: ZTE; Date and Location: Apr. 16-20, 2018, Sanya, China; consisting of 5 pages.
3GPP TSG RAN meeting #82 RP-182891 was RP-182821; Title: Revised WID: Additional MTC enhancements for LTE; Agenda Item: 10.4.1; Document for: Approval; Source: Qualcomm Incorporated; Date and Location: Dec. 10-13, 2018, Sorrento, Italy; consisting of 4 pages.
3GPP TSG-RAN WG1 Meeting #95 R1-1813795; Title: RAN1 agreements for Rel-16 Additional MTC Enhancements for LTE; Agenda Item: 6.2.1; Document for: Information; Source: WI rapporteur (Ericsson); Date and Location: Nov. 12-16, 2018, Spokane, USA; consisting of 17 pages.
3GPP TSG-RAN WG2 #105 Tdoc R2-1901194; Title: Paging multiplexing and UE mobility of group WUS; Agenda Item: 12.2.3; Document for: Discussion, Decision; Source: Ericsson; Date and Location: Feb. 25-Mar. 1, 2019, Athens, Greece; consisting of 6 pages.
3GPP TSG-RAN WG2 #105 Tdoc R2-1901195; Title UE_ID based WUS grouping; Agenda Item: 12.2.3; Document for: Discussion, Decision; Source: Ericsson; Date and Location: Feb. 25-Mar. 1, 2019, Athens, Greece; consisting of 4 pages.
3GPP TS 36.331 V15.4.0; 3rd Generation Partnership Project; Technical Specification Group Radio Access Network; Evolved Universal Terrestrial Radio Access (E-UTRA); Radio Resource Control (RRC): Protocol specification (Release 15); Dec. 2018; consisting of 933 pages.
3GPP TSG RAN WG1 Meeting #95 R1-1812133; Title: UE-group wake-up signal; Agenda Item: 6.2.2.1; Document for: Discussion and decision; Source: Huawei, HiSilicon; Date and Location: Nov. 12-16, 2018, Spokane, USA; consisting of 9 pages.
3GPP TS 36.211 V15.4.0; 3rd Generation Partnership Project; Technical Specification Group Radio Access Network; Evolved Universal Terrestrial Radio Access (E-UTRA): Physical channels and modulation (Release 15); Dec. 2018; consisting of 240 pages.
Chinese Office Action and English Summary dated Feb. 29, 2024 for Application No. 202080014553.6, consisting of 10 pages.
U.S. Office Action dated Mar. 14, 2024 for U.S. Appl. No. 17/426,909, consisting of 32 pages.

WIRELESS COMMUNICATION DEVICE, RADIO ACCESS NETWORK NODE, METHODS, AND COMPUTER PROGRAMS FOR POWER EFFICIENT PAGING ESCALATION

CROSS-REFERENCE TO RELATED APPLICATIONS

This application is a Submission Under 35 U.S.C. § 371 for U.S. National Stage Patent Application of International Application No.: PCT/EP2020/053832, filed Feb. 14, 2020 entitled "WIRELESS COMMUNICATION DEVICE, RADIO ACCESS NETWORK NODE, METHODS, AND COMPUTER PROGRAMS FOR POWER EFFICIENT PAGING ESCALATION," which claims priority to U.S. Provisional Application No. 62/805,619, filed Feb. 14, 2019, entitled "WIRELESS COMMUNICATION DEVICE, RADIO ACCESS NETWORK NODE, METHODS, AND COMPUTER PROGRAMS FOR POWER EFFICIENT PAGING ESCALATION," the entireties of both of which are incorporated herein by reference.

TECHNICAL FIELD

The present disclosure generally relates to a wireless communication device, a radio access network node, methods therefor, and computer programs for implementing the methods. In particular the present disclosure relates to saving energy for wireless devices by discriminating between notifications for stationary and mobile devices at paging escalation.

BACKGROUND

There has been a lot of work in $3^{rd}$ Generation Partnership Project (3GPP) lately on specifying technologies to cover Machine-to-Machine (M2M) and/or Internet of Things (IoT) related use cases. Most recent work for 3GPP Release 13 and 14 includes enhancements to support Machine-Type Communications (MTC) with new user equipment (UE) categories (Cat-M1, Cat-M2), supporting reduced bandwidth of 6 physical resource blocks (PRBs), and up to 24 PRBs for Cat-M2, and Narrowband IoT (NB-IoT) UEs providing a new radio interface and UE categories (Cat-NB1 and Cat-NB2).

It will be referred to Long Term Evolution (LTE) enhancements introduced in 3GPP Release 13, 14 and 15 for MTC as "eMTC", including, but not limiting to, support for bandwidth limited UEs, such as Cat-M1, and support for coverage enhancements. This is to separate discussion from NB-IoT, which notation here is used for any Release, although the supported features are similar on a general level.

There are multiple differences between "legacy" LTE and the procedures and channels defined for eMTC and for NB-IoT. Some important differences include a new physical channel, such as MTC physical downlink control channels (MPDCCH) in eMTC and NB-IoT physical downlink control channels (NPDCCH) in NB-IoT, and NB-IoT physical random access channel (NPRACH) for NB-IoT. Another important difference is the coverage level, also known as coverage enhancement level, that these technologies can support. By applying repetitions to the transmitted signals and channels, both eMTC and NB-IoT allow UE operation down to much lower signal-to-noise (SNR) level compared with LTE, i.e. Es/Iot≥−15 dB being the lowest operating point for eMTC and NB-IoT which can be compared with −6 dB Es/IoT for "legacy" LTE.

Figure 1:
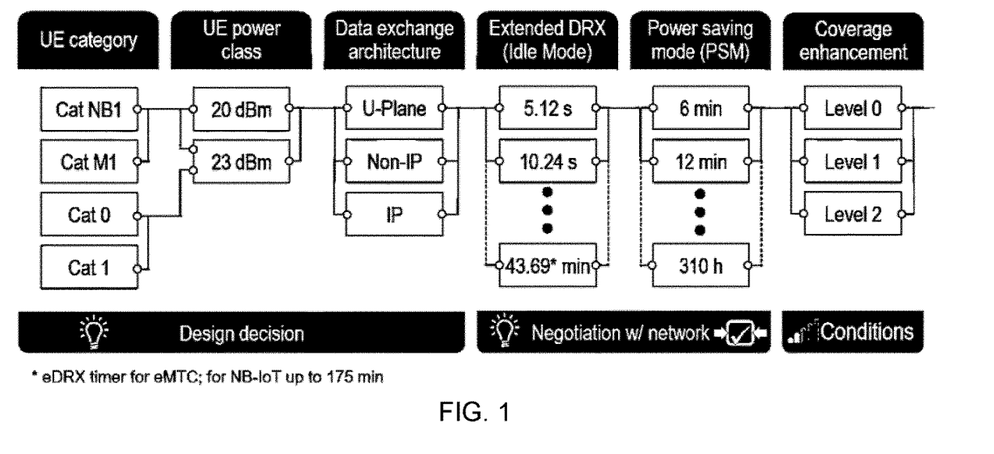
FIG. 1 illustrates a set of options for power consumption reduction.

FIG. 1 illustrates a set of options for power consumption reduction. Here, the extended discontinuous reception (eDRX) mode and the power saving mode (PSM) options refer to letting the UE go to Radio Resource Control (RRC) idle mode where the UE consumes significantly less energy than in RRC connected mode.

Figure 2:
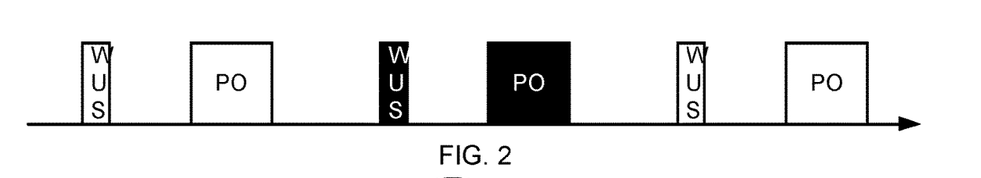
FIG. 2 schematically illustrates an approach for wake-up signals and paging.

Periodically, the UE in idle mode starts the receiver to synchronise to the camped on cell and to check for notifications whether it should leave the idle mode for being able to communicate with a network node. For such a notification, a 'Wake-up signal' (WUS) can be used, which is based on the transmission of a short signal that indicates to the UE that it should continue to decode a downlink (DL) control channel e.g. full MPDCCH for eMTC. If such signal is absent (e.g. discontinuous transmission (DTX) is applied by the network node, i.e. UE does not detect any signal) then the UE can remain in idle mode and refrain from decoding the DL control channel. The decoding time for a WUS is considerably shorter than that of the full MPDCCH since it essentially only needs to contain one bit of information whereas the MPDCCH may contain up to 35 bits of information. This, in turn, reduces UE power consumption and leads to longer UE battery life. The 'Wake-up signal' (WUS) would be transmitted only when there is paging for the UE. But if there is no paging for the UE then the WUS will not be transmitted, i.e., implying DTX, and the UE would go back to idle e.g. upon "detecting" DTX instead of WUS. This is illustrated in FIG. 2, where white blocks indicate possible WUS and paging occasion (PO) positions whereas the black boxes indicate actual WUS and PO positions. Presently, according to 3GPP TS 36.211, v15.4.0, section 6.11B, the WUS sequence is only dependent on the time instant of the PO to which it is associated and the eNB cell id. That implies that it is not possible to further distinguish which UE(s) that is paged among the UEs belonging to the same PO. In many cases only a single UE is paged at a time, in which case the remaining UEs will unnecessarily monitor the subsequent MPDCCH.

The following 3GPP contributions may provide further background knowledge for the understanding of this disclosure:

RP-182891, "Additional MTC enhancements for LTE," Ericsson, RAN #82, Sorrento, Italy, December 2018.

R1-1813795, "RAN1 agreements for Rel-16 Additional MTC Enhancements for LTE," Ericsson, RAN1 #95, Spokane, USA, November 2018.

R2-1901194, "Paging multiplexing and UE mobility of group WUS," Ericsson, RAN2 #105, Athens, Greece, February 2019.

R2-1901195, "UE_ID based WUS grouping," Ericsson, RAN2 #105, Athens, Greece, February 2019.

R1-1812119, "UE-group wake-up signal in LTE-MTC," Ericsson, RAN1 #95, Spokane, USA, November 2018.

3GPP TS 36.331, "E-UTRA; Radio Resource Control (RRC) protocol specification," V15.4.0, December 2018.

R1-1812454, "UE-group wake-up signal for eMTC," Intel, RAN1 #95, Spokane, USA, November 2018.

R1-1812133, "UE-group wake up signal," Huawei, RAN1 #95, Spokane, USA, November 2018.

The above information disclosed in this Background section is only for enhancement of understanding of the background of the disclosure and therefore it may contain information that does not form the prior art that is already known to a person of ordinary skill in the art.

SUMMARY

The disclosure is based on the inventors' understanding that power can be saved for stationary devices at paging escalation by discriminating between notifications for stationary devices and mobile devices.

According to a first aspect, there is provided a wireless communication device arranged to operate in a cellular communication system. The wireless communication device comprises a receiver arranged to receive radio signals from a radio access network node of the cellular communication system, and a signal detector arranged to detect a first signal and a second signal among the signals received from the access network node of the cellular communication system. The first signal comprises a network synchronisation signal comprising information about synchronisation and an identification of a cell associated with the access network node. The second signal comprises a notification. The wireless communication device further comprises a controller arranged to cause the signal detector to either detect a notification of a first type when the received identification of the cell is equal to a previous reception of an identification of a cell at a last mutual interaction between the wireless communication device and the cellular communication system, or detect a notification of a second type when the received identification of the cell differs from the previous reception of the identification of the cell at the last mutual interaction between the wireless communication device and the cellular communication system.

The notification may include a wake-up signal indicating that a paging signal should be read from the received signals, or a paging signal.

The signal detector may comprise a correlator for detecting the second signal, and the notification of the first type comprises a sequence having low correlation with a sequence of the notification of the second type.

According to a second aspect, there is provided a method of a wireless communication device which is arranged to operate in a cellular communication system. The method comprises receiving radio signals from a radio access network node of the cellular communication system, and detecting a first signal and a second signal among the signals received from the access network node of the cellular communication system. The first signal comprises a network synchronisation signal comprising information about synchronisation and an identification of a cell associated with the access network node, and the second signal comprises a notification. The detecting of the notification comprises either detecting a notification of a first type when the received identification of the cell is equal to a previous reception of an identification of a cell at a last mutual interaction between the wireless communication device and the cellular communication system, or detecting a notification of a second type when the received identification of the cell differs from the previous reception of the identification of the cell at the last mutual interaction between the wireless communication device and the cellular communication system.

The notification may include a wake-up signal indicating that a paging signal should be read from the received signals or a paging signal.

The detecting may comprise correlating the second signal with a sequence for applicable type of notification, wherein the notification of the first type comprises a sequence having low correlation with a sequence of the notification of the second type.

According to a third aspect, there is provided a radio access network node arranged to operate in a cellular communication system. The radio access network node comprises an interface towards the cellular communication system, a transceiver arranged to interact by radio signals, comprising a first signal and a second signal to be transmitted, with one or more wireless communication devices, wherein the first signal comprises a network synchronisation signal comprising information about synchronisation and an identification of a cell associated with the radio access network node, and the second signal comprises a notification, and a controller arranged to determine, from a paging message for a wireless device received over the interface, a last identification of a cell to which the wireless device had a last mutual interaction between the wireless communication device and the cellular communication system, form the notification to be of either a first type when the determined identification of the cell is equal to an identification of a cell operated by the radio access network node, or a second type when the determined identification of the cell differs from the identification of the cell operated by the radio access network node.

The notification may be a paging signal or a wake-up signal indicating that a paging signal should be read from the transmitted signals.

The notification of the first type may comprise a sequence having low correlation with a sequence of the notification of the second type.

According to a fourth aspect, there is provided a method of a radio access network node which is arranged to operate in a cellular communication system. The method comprises receiving a paging message for a wireless device from another node of the cellular communication system, determining, from the paging message a last identification of a cell to which the wireless device had a last mutual interaction between the wireless communication device and the cellular communication system, and transmitting a first signal and a second signal. The first signal comprises a network synchronisation signal comprising information about synchronisation and an identification of a cell associated with the radio access network node, and the second signal comprises a notification. The notification is of either a first type when the determined identification of the cell is equal to an identification of a cell operated by the radio access network node, or a second type when the determined identification of the cell differs from the identification of the cell operated by the radio access network node.

The notification may include a wake-up signal indicating that a paging signal should be read from the transmitted signals or a paging signal.

The notification of the first type may comprise a sequence having low correlation with a sequence of the notification of the second type.

According to a fifth aspect, there is provided a computer program comprising instructions which, when executed on a processor of a wireless communication device, causes the wireless communication device to perform the method according to the second aspect.

According to a sixth aspect, there is provided a computer program comprising instructions which, when executed on a processor of a radio access network node, causes the radio access network node to perform the method according to the fourth aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

In Release 16, it is expected that WUS should be further developed to also include UE grouping, such that the number of UEs that are sensitive to the WUS is further narrowed down to a subset of the UEs that are associated with a specific PO.

Figure 3:
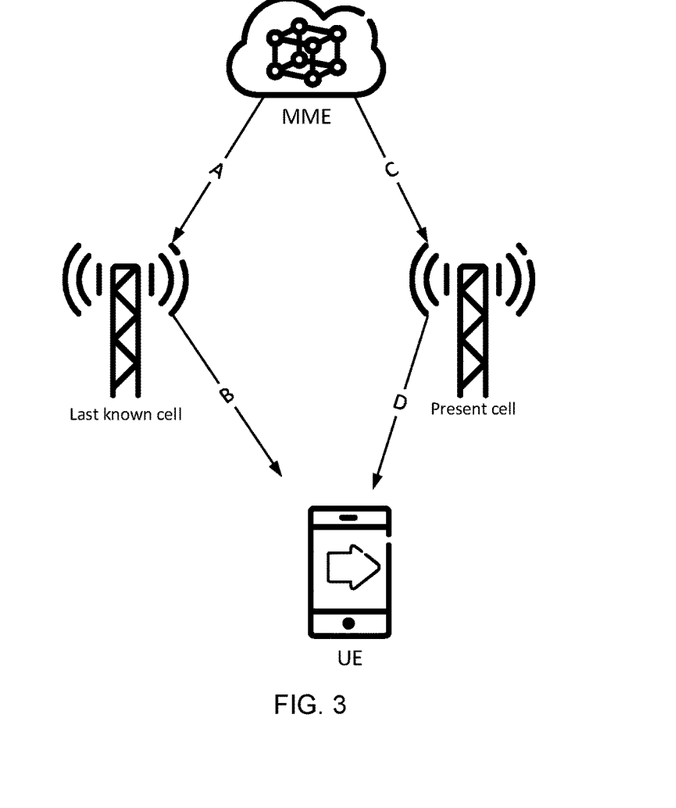
FIG. 3 illustrates a process of paging escalation.

One consideration that the inventors have realized to be needed to be taken into account when designing the WUS is UE mobility. Mobility is managed by the Mobility Management Entity (MME) which is a control node that is responsible for responsible for idle mode UE (User Equipment) paging and tracking procedure including retransmissions. If a UE is not identified in a service of one node, the MME determines in which other areas served by other nodes to try to page the UE, i.e., paging escalation. For example, the MME may determine that a UE that is being paged should first be searched in the UE's last known cell, i.e. corresponding to the by the network last know location. If the UE is not found in its last known cell, the MME may escalate the paging into other cells, and eventually e.g. to a whole tracking area (TA). FIG. 3 illustrates the process of paging escalation. In (A), the MME sends a paging message to the last known cell of the UE, which then, in turn, in (B), attempts to page the UE by transmitting a wake-up signal or a paging signal defined by a PDCCH transmission scheduling a PDSCH transmission for which Cyclic Redundancy Check (CRC) is scrambled by a paging radio network temporary identifier (P-RNTI). If the eNB for the last known cell is unable to reach the UE, the MME in (C) escalates the paging to more eNBs including the present cell of the UE by sending paging messages to them, e.g. the whole tracking area, where the other eNBs attempt to page the UE (D).

From the perspective of a WUS capable UE, it is necessary that there is a standardized behaviour for WUS also for mobile UEs. For example, the UE needs to know if it should use WUS at all when waking up in another cell, and if so, which WUS it should use. According to Rel-15, UEs use WUS in all WUS configured cells. Since the Rel-15 WUS is uniquely defined by the cell ID and timing, the UE knows on forehand which WUS to look for. However, it also means that all WUS capable UEs in a whole tracking area may be falsely woken up if the MME needs to escalate paging when it is not able to find even a single a UE in its last known cell. Present basis for group WUS does not consider the mobility aspect. Instead focus is on randomization by UE identity (ID), services, DRX or eDRX periods, UE coverage levels etc. However, mobility is an important aspect for power consumption reduction, since if the UE is not found in its last known cell, paging escalation will require paging in multiple cells, e.g. a whole tracking area or more which may comprise tens or hundreds of eNBs. Hence, a single mobile UE may increase the power consumption with several magnitudes for other UEs as compared with a stationary UE. This, since it will cause all UEs belonging to the same UE group as the mobile UE within multiple eNBs or cells to be falsely woken up when the mobile UE is paged.

The inventors have realized that when a wireless network node (eNB) for transmitting a paging message to a wireless device (UE) receives a paging message from another network node, e.g., a mobility messaging entity (MME), the eNB determines from the paging message whether the paging cell is the last known cell or not. Based on the determination, the eNB will determine a signal to associate with the paging message, i.e. whether it should page stationary UEs or mobile UEs which are UEs which have moved from another cell since last interaction with the cellular network, i.e. at a last mutual interaction between the wireless communication device and the cellular communication system such as a tracking area update (TAU) or a connection setup, e.g. roughly when Non-Access Stratum (NAS) signalling occurred. This 'last known cell', i.e. the cell ID of it, is stored in MME and readily in the UE. Both the UE and the cellular wireless network will have a common understanding about when and where this occurred.

Thus, a different WUS signalling procedure will be applied depending on if paging is transmitted in the last known cell or in another cell. The signal is then transmitted at a predetermined resource. Time and frequency resources used for the paging may differ depending on if paging is transmitted in the last known cell or in another cell. Correspondingly, a method is provided for a wireless device for receiving a paging message from a wireless network node targeting the UE. First, the UE synchronizes towards the network, thereby achieving time and frequency synchronization and cell identification. Based on this, the UE may determine whether it is camping on the, by the network, last known cell or not. Having determined that, the UE may further determine a signal that is associated with the paging message. Based on the determination, the UE further determines a signal associated with the paging message to the UE. The UE will apply a different WUS signal monitoring procedure depending on whether it has found itself located in the "last known cell" or not. The UE then attempts to detect the signal in a predefined time frequency resource, and consequently can disregard notifications directed to mobility UEs if it has determined that it is still in the "last known cell". Stationary UEs can thus save energy.

In summary, this disclosure is introducing a specific WUS UE group for mobile UEs, allowing the network to page mobile UEs without falsely waking up stationary UEs and thereby reducing their longevity. An advantage is a decreased number of UEs being affected by pages addressed to another UE due to mobile UEs being paged outside of their last known cell at paging escalation. As a result, the majority of stationary UEs may remain in idle mode or faster resume idle mode and thereby increase their power savings and longevity.

Figure 4:
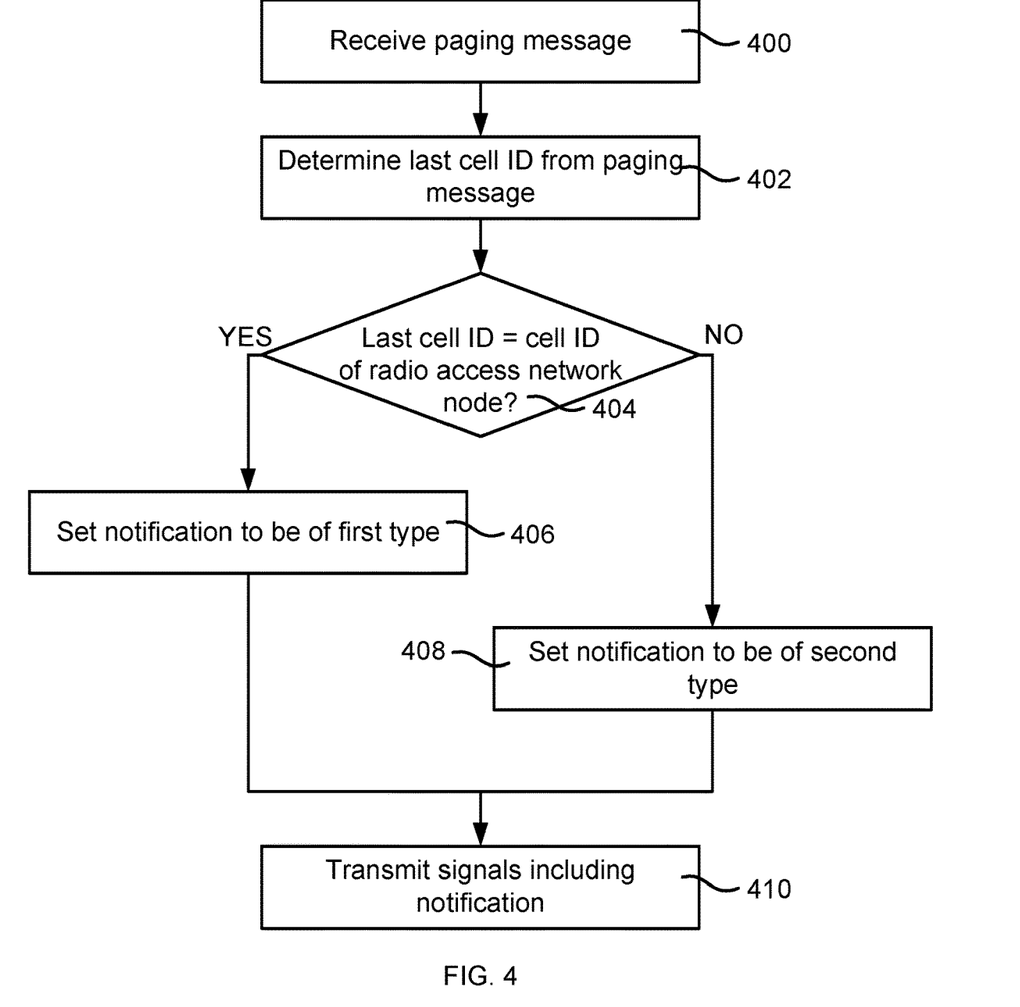
FIG. 4 is a flow chart schematically illustrating a method for a radio access network (RAN) node.

FIG. 4 is a flow chart schematically illustrating a method for a radio access network (RAN) node, such as an eNB, according to an embodiment. The RAN node receives 400 a paging message from the cellular network, e.g. from an MME node. In the paging message, there is included various information, e.g. what UE is to be paged and also information about last cell ID for the cell that the UE last was connected to. Therefore, the RAN node determines 402 the received last cell ID and compares 404 it with a cell ID of the cell the RAN node is operating. If the last cell ID and the cell ID of the RAN node agrees, the RAN node arranges for a first type of notification to be sent, i.e. a group notification for stationary UEs as discussed above. If the last cell ID is different, i.e. the UE to be notified has changed cell since last connection and for example paging escalation has been activated, the RAN node arranges for a second type of notification to be sent, i.e. a group notification for mobile UEs as discussed above.

The notifications can include wake-up signals or paging signals, or any other kind of notifications used for UEs being in a power save mode. For example, that may be a Type 1 MPDCCH Common Search Space (CSS) for MTC and Type 1 NPDCCH CSS for NB-IoT. In some embodiments, the first type of notification is a general wake-up signal and the second type of notification is a wake-up signal only addressing the devices which themselves know that they have changed cell. In some embodiments, the first type of notification is a wake-up signal and the second type of notification is a paging signal where the devices which themselves known that they have changed cell look for the paging signal. Thus, the setup is in general for the embodiments such that the devices which know that they have not changed cell performs the very lean check such that they can return to idle quickly if not addressed, while the devices which know that they have changed cell may do a more energy consuming check. For the UE being able to readily read the right notification type, the notifications of the first type and the second type may be sequences, respectively, having low correlation. In another case, the signal is differentiated by the P-RNTI. For this case, if the cell ID of the cell in which the page is transmitted is equal to the last known cell of the UE, a first P-RNTI is used for the paging transmission whereas a second P-RNTI is used in case the cell ID of the cell in which the page is transmitted is different from the last known cell ID of the UE. Traditionally, the P-RNTI is a fixed 16-bit code word but the set of P-RNTIs code word may be extended for the purpose above. Further, in yet another case, the paging signal may, in case the cell ID of the cell in which the page is transmitted is different from the last known cell ID, be transmitted on a different frequency, compared to the case in which the cell ID of the cell in which the page is transmitted is the same as the last known cell ID. The frequency may i.e. be determined by a EUTRA (Evolved UMTS (Universal Mobile Telecommunications System) Terrestrial Radio Access) Absolute Radio Frequency Channel Number (EARFCN). Currently both NB-IoT and eMTC supports paging on different frequency channels, known as paging carriers in the case of NB-IoT and paging narrow bands for eMTC. A sub-set of the available paging carriers, and paging narrow bands, can be reserved for paging in case of escalating the page to cells other than the last known cell. A different timing may alternatively or additionally be used. For example a WUS timing resource may be applied, although the paging occasion is unchanged, i.e. slightly before the paging occasion.

The RAN node has thus arranged for the suitable type of notification, and then transmits 410 the notification when scheduled, e.g. as discussed above with reference to FIG. 2.

With this seemingly simple approach, the RAN node actually can act in a way where UEs which are stationary can save energy significantly and do this based on very little signalling, e.g. the RAN node does not need to know much about the paging escalation.

Figure 5:
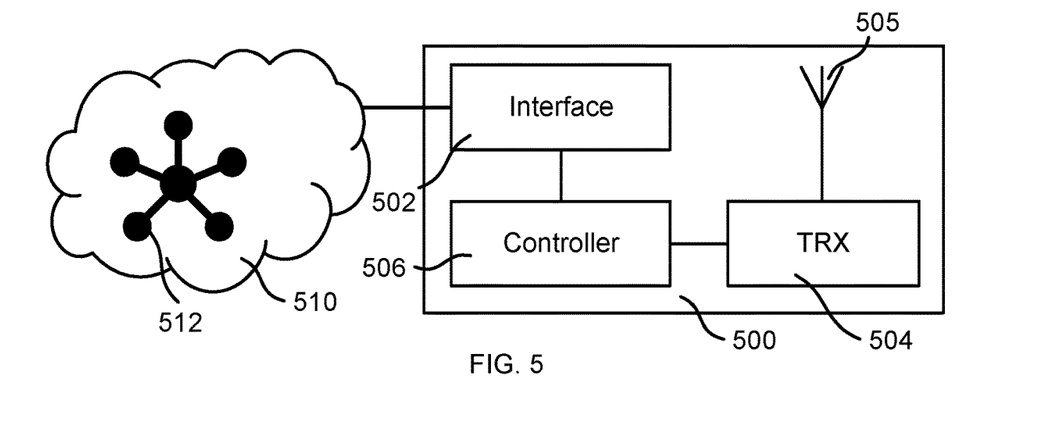
FIG. 5 is a block diagram schematically illustrating relevant parts of a RAN node.

FIG. 5 is a block diagram schematically illustrating relevant parts of a RAN node 500. Other parts normally included in a RAN node are not shown not to obscure the contribution disclosed herein. The RAN node interacts with a cellular network 510 comprising a plurality of nodes and among them a node 512 providing a paging message to the RAN node 500. The interaction is handled by an interface 502 of the RAN node 500. The RAN node 500 comprises a transceiver 504 arranged to interact by radio signals through an antenna arrangement 505 with one or more wireless communication devices. The RAN node comprises a controller 506 which is arranged to determine from the paging message received over the interface a last identification of a cell for a wireless device to which the wireless device had radio interaction. The transceiver 504 provides a first signal and a second signal over the antenna 505 wherein the first signal comprises a network synchronisation signal comprising information about synchronisation and an identification of a cell associated with the radio access network node, and the second signal comprises a notification, as discussed above. The controller 506 has thus arranged to form the notification to be of either a first type when the determined identification of the cell is equal to an identification of a cell operated by the radio access network node, or a second type when the determined identification of the cell differs from the identification of the cell operated by the radio access network node.

Figure 6:
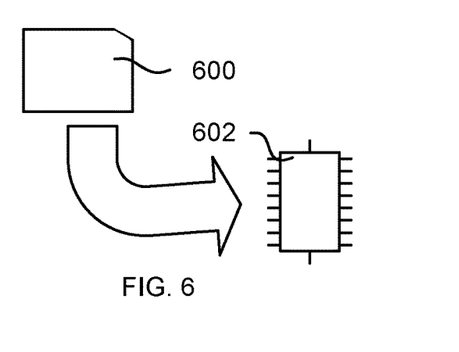
FIG. 6 schematically illustrates a computer-readable medium and a processing device for a RAN node.

The methods according to the present disclosure is suitable for implementation with aid of processing means, such as computers and/or processors, especially for the case where the controller 506 demonstrated above comprises a processor handling notification of UEs. Therefore, there is provided computer programs, comprising instructions arranged to cause the processing means, processor, or computer to perform the steps of any of the methods according to any of the embodiments described with reference to FIG. 4. The computer programs preferably comprise program code which is stored on a computer readable medium 600, as illustrated in FIG. 6, which can be loaded and executed by a processing means, processor, or computer 602 to cause it to perform the methods, respectively, according to embodiments of the present disclosure, preferably as any of the embodiments described with reference to FIG. 4. The computer 602 and computer program product 600 can be arranged to execute the program code sequentially where actions of the any of the methods are performed stepwise, or be performed on a real-time basis. The processing means, processor, or computer 602 is preferably what normally is referred to as an embedded system. Thus, the depicted computer readable medium 600 and computer 602 in FIG. 6 should be construed to be for illustrative purposes only to provide understanding of the principle, and not to be construed as any direct illustration of the elements.

Figure 7:
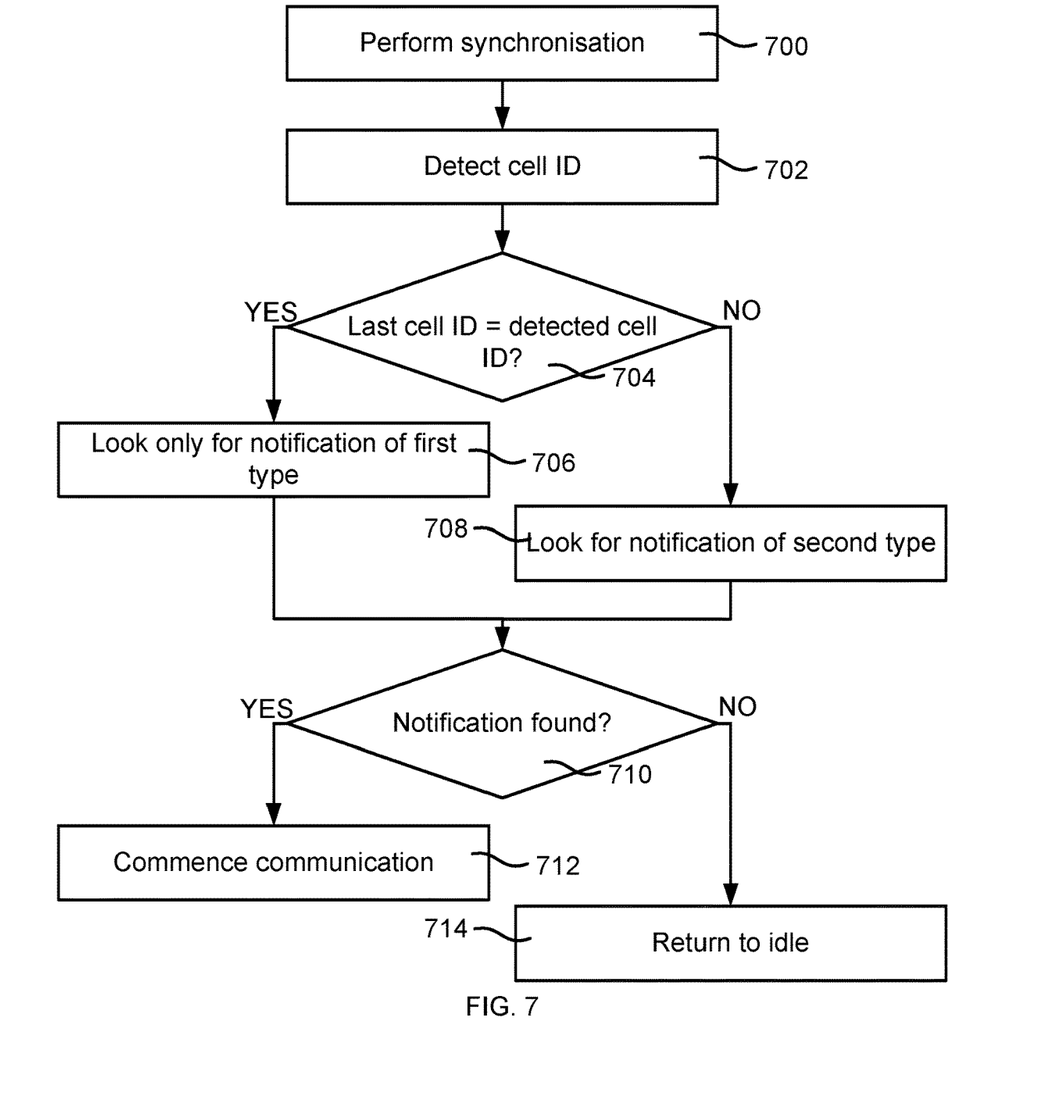
FIG. 7 is a flow chart schematically illustrating a method for a wireless communication device.

FIG. 7 is a flow chart schematically illustrating a method for a wireless communication device, such as a UE. The wireless communication device performs 700 synchronisation, e.g. by receiving primary and secondary synchronisation signals. This is performed regularly also at idle mode, although the periods may be long. Thereby, signals containing information about cell identity of the cell, i.e. network node, providing the synchronisation signals. Thus, in addition to the synchronisation 700 regarding timing and frequency, the wireless communication device detects 702 the cell identity, cell ID. The wireless communication device knows, e.g. from stored information, cell identity from last time it was in communication with the cellular network. The wireless communication device thus compares 704 the cell ID determined from synchronisation with the stored cell ID for the last cell which it was in communication with. If they are the same, the wireless communication device is considered stationary and listening 706 for notifications is performed only, among the notifications of a first type and a second type, for notifications of the first type, i.e. the type sent for stationary devices, and disregards notifications of the second type, i.e. the type sent for mobile devices. Here, "stationary" and "mobile" refer to device movements since last communication with the cellular network, and does not necessarily reflect structural features of the devices. If the cell ID determined from synchronisation and the stored cell ID for the last cell which it was in communication with differs, the wireless communication device has moved and is thus considered mobile wherein the wireless communication device listens 708 for notifications of the second type. Here, the wireless communication device may also listen for notifications of the first type also when the cell ID determined from synchronisation and the stored cell ID for the last cell which it was in communication with differs since it may not be evident for the wireless communication device that the current network node provides the features of differentiating between stationary and mobile devices. Listening also for notifications of the first type can thus provide backwards compatibility.

It is determined 710 whether a relevant notification was found. If a relevant notification was found, the wireless communication device commences 712 communication, which for example may include listening for a paging message, transmitting a random access control message, or other signalling for commencing communication. If a relevant notification was not found, the wireless communication can directly go back to idle 714. This swift determination that the wireless communication device can return to idle provides for low energy consumption for devices which are not to be activated.

Figure 8:
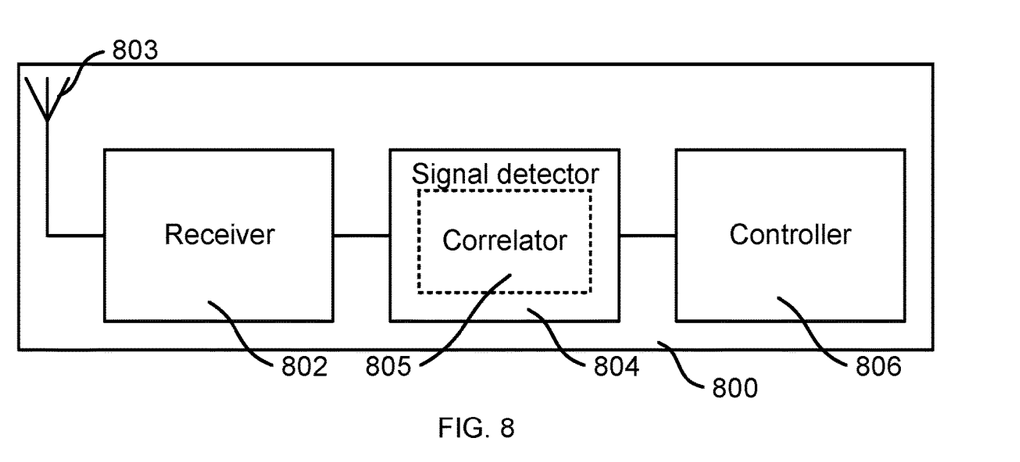
FIG. 8 is a block diagram schematically illustrating a wireless communication device.

FIG. 8 is a block diagram schematically illustrating a wireless communication device 800, such as a UE. Only parts relevant to the contribution by this disclosure are shown, and other parts normally included in a wireless communication device are not shown not to obscure the contribution disclosed herein. The wireless communication device comprises a receiver 802 which is arranged to receive radio signals through an antenna arrangement 803. Among the signals received by the receiver 802, we can mention the synchronisation signals and the signals comprising the notifications, as demonstrated above. The receiver provides received signals, e.g. after provision of a baseband signal, to a signal detector 804. The signal detector 804 is for example arranged to find notification signals as demonstrated above. A neat solution for the notifications of the first type and the second type is that they each comprise a sequence, wherein the sequences have mutual low correlation. The notifications of the first type and the second type may be transmitted in separate resource elements, or for some setups as alternatives for common resource elements. The signal detector 804 can then for example comprise a correlator 805 which correlates received signals with the sought kind of notification. The not sought notification will thus be considered as noise, and will not trigger any commencing of communications. Here, the signal detector provides its results to a controller 806 which determines the operations of the wireless communication device 800. The signal detector 804 and the controller 806 may be implemented as a common processor performing the signal detection and control of behaviour of the wireless communication device 800.

Figure 9:
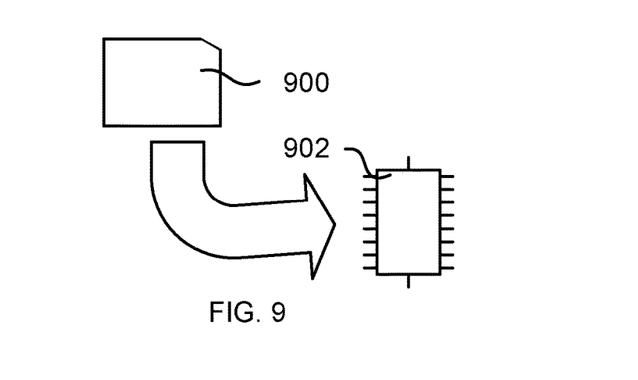
FIG. 9 schematically illustrates a computer-readable medium and a processing device for a wireless communication device.

The methods according to the present disclosure is suitable for implementation with aid of processing means, such as computers and/or processors, especially for the case where the controller 806 and the signal detector 804 demonstrated above comprises a processor handling detection of notifications. Therefore, there is provided computer programs, comprising instructions arranged to cause the processing means, processor, or computer to perform the steps of any of the methods according to any of the embodiments described with reference to FIG. 7. The computer programs preferably comprise program code which is stored on a computer readable medium 900, as illustrated in FIG. 9, which can be loaded and executed by a processing means, processor, or computer 902 to cause it to perform the methods, respectively, according to embodiments of the present disclosure, preferably as any of the embodiments described with reference to FIG. 7. The computer 902 and computer program product 900 can be arranged to execute the program code sequentially where actions of the any of the methods are performed stepwise, or on a real-time basis. The processing means, processor, or computer 902 is preferably what normally is referred to as an embedded system. Thus, the depicted computer readable medium 900 and computer 902 in FIG. 9 should be construed to be for illustrative purposes only to provide understanding of the principle, and not to be construed as any direct illustration of the elements.

The Disclosure May be Summarised by the Following Items

1. A wireless communication device arranged to operate in a cellular communication system, the wireless communication device comprising
a receiver arranged to receive radio signals from a radio access network node of the cellular communication system;
a signal detector arranged to detect a first signal and a second signal among the signals received from the access network node of the cellular communication system, wherein
the first signal comprises a network synchronisation signal comprising information about synchronisation and an identification of a cell associated with the access network node, and
the second signal comprises a notification; and
a controller arranged to cause the signal detector to
either detect a notification of a first type when the received identification of the cell is equal to a previous reception of an identification of a cell at a last mutual interaction between the wireless communication device and the cellular communication system,
or detect a notification of a second type when the received identification of the cell differs from the previous reception of the identification of the cell at the last mutual interaction between the wireless communication device and the cellular communication system.

2. The wireless communication device of item 1, wherein the notification includes a wake-up signal indicating that a paging signal should be read from the received signals.

3. The wireless communication device of item 1 or 2, wherein the notification includes a paging signal.

4. The wireless communication device of any one of items 1 to 3, wherein the signal detector comprises a correlator for detecting the second signal, and the notification of the first type comprises a sequence having low correlation with a sequence of the notification of the second type.

5. The wireless communication device of any one of items 1 to 4, wherein the first and second types of notifications are differentiated by different code words of a paging radio network temporary identifier.

6. A method of a wireless communication device which is arranged to operate in a cellular communication system, the method comprising
receiving radio signals from a radio access network node of the cellular communication system; and
detecting a first signal and a second signal among the signals received from the access network node of the cellular communication system, wherein
the first signal comprises a network synchronisation signal comprising information about synchronisation and an identification of a cell associated with the access network node, and
the second signal comprises a notification,
wherein the detecting of the notification comprises
either detecting a notification of a first type when the received identification of the cell is equal to a previous reception of an identification of a cell at a last mutual interaction between the wireless communication device and the cellular communication system,
or detecting a notification of a second type when the received identification of the cell differs from the previous reception of the identification of the cell at the last mutual interaction between the wireless communication device and the cellular communication system.

7. The method of item 6, wherein the notification includes a wake-up signal indicating that a paging signal should be read from the received signals.

8. The method of item 6 or 7, wherein the notification includes a paging signal.

9. The method of any one of items 6 to 8, wherein the detecting comprises correlating the second signal with a sequence for applicable type of notification, wherein the notification of the first type comprises a sequence having low correlation with a sequence of the notification of the second type.

10. The method of any one of items 6 to 9, wherein the first and second types of notifications are differentiated by different code words of a paging radio network temporary identifier.

11. A radio access network node arranged to operate in a cellular communication system, the radio access network node comprising
an interface towards the cellular communication system;
a transceiver arranged to interact by radio signals, comprising a first signal and a second signal to be transmitted, with one or more wireless communication devices, wherein the first signal comprises a network synchronisation signal comprising information about synchronisation and an identification of a cell associated with the radio access network node, and the second signal comprises a notification; and
a controller arranged to
determine, from a paging message for a wireless device received over the interface, a last identification of a cell to which the wireless device had a last mutual interaction between the wireless communication device and the cellular communication system;
form the notification to be of
either a first type when the determined identification of the cell is equal to an identification of a cell operated by the radio access network node,
or a second type when the determined identification of the cell differs from the identification of the cell operated by the radio access network node.

12. The radio access network node of item 11, wherein the notification includes a wake-up signal indicating that a paging signal should be read from the transmitted signals.

13. The radio access network node of item 11 or 12, wherein the notification includes a paging signal.

14. The radio access network node of any one of items 11 to 13, wherein the notification of the first type comprises a sequence having low correlation with a sequence of the notification of the second type.

15. The radio access network node of any one of items 11 to 14, wherein the first and second types of notifications are differentiated by different code words of a paging radio network temporary identifier.

16. A method of a radio access network node which is arranged to operate in a cellular communication system, the method comprising
receiving a paging message for a wireless device from another node of the cellular communication system;
determining, from the paging message a last identification of a cell to which the wireless device had a last mutual interaction between the wireless communication device and the cellular communication system; and
transmitting a first signal and a second signal, wherein the first signal comprises a network synchronisation signal comprising information about synchronisation and an identification of a cell associated with the radio access network node, and the second signal comprises a notification,
wherein the notification is of
either a first type when the determined identification of the cell is equal to an identification of a cell operated by the radio access network node,
or a second type when the determined identification of the cell differs from the identification of the cell operated by the radio access network node.

17. The method of item 16, wherein the notification includes a wake-up signal indicating that a paging signal should be read from the transmitted signals.

18. The method of item 16, wherein the notification includes a paging signal.

19. The method of any one of items 16 to 18, wherein the notification of the first type comprises a sequence having low correlation with a sequence of the notification of the second type.

20. The method of any one of items 16 to 19, wherein the first and second types of notifications are differentiated by different code words of a paging radio network temporary identifier.

21. A computer program comprising instructions which, when executed on a processor of a wireless communication device, causes the wireless communication device to perform the method according to any of items 6 to 10.

22. A computer program comprising instructions which, when executed on a processor of a radio access network node, causes the radio access network node to perform the method according to any of items 16 to 20.

For multiplexing between Rel-16 UE-group WUS and Rel-15 WUS, further evaluate and down select among the following options
TDM
FDM
single-seq CDM
single-seq CDM+TDM
single-seq CDM+FDM
FFS whether legacy WUS is the common WUS for all new UEs or only a part of new UEs.

For multiplexing between different Rel-16 UE-group WUS, further evaluate and down select among the following options
single-seq CDM
FDM
single-seq CDM+TDM
single-seq CDM+FDM Note: At least the maximum number of UE groups should be considered.

The number of UE groups is configurable and broadcasted in SIB.
FFS: Further details on the number of UE groups. For example, whether it is per PO or per gap configuration of a PO UE group ID is used as a parameter to generate WUS UE group sequence(s). One group WUS is designed as a single sequence. False detection (cross/auto correlation) performance properties for the following designs may be considered:
legacy WUS+cover codes,
legacy WUS+shifted scrambling codes,
legacy WUS+phase shift+cover code+scrambling bits
Including combinations of phase shift, cover code, and/or scrambling bits Other designs are not precluded.

Rel-16 group WUS uses the same gap configurations as for Rel-15 legacy WUS except for differences from possible TDM. No new gap higher layer signalling is expected to be introduced for TDM According to an example, there is a group WUS concept fulfilling the following requirements:
Paging of legacy WUS UEs without waking up group WUS UEs
Paging of all group WUS UEs, ideally without waking up legacy WUS UEs
Paging of group WUS UEs in a single group There are good reasons why this is a minimum requirement for group WUS. First, without separating legacy WUS from group WUS, it will not be possible to reduce the false paging rate and thereby achieve better power savings in group WUS compared to legacy WUS. The second bullet is of less importance, since the alternative for legacy WUS UEs is more UEs using legacy WUS which is just as bad. Still, if the two can be separated without any downside to it, it is desirable to separate legacy WUS and group WUS. This task seems to be easier for MTC than for NB-IoT due to the more available resources.

Group WUS may provide functionality to support the following scenarios:
a. Paging of legacy WUS UEs without waking up group WUS UEs
b. Paging of all group WUS UEs without waking up legacy UEs
c. Paging of group WUS UEs in a single group In order to fulfill the above requirements, the group WUS functionality that is used to support the above requirements are as follows:
Legacy WUS and group WUS are differentiated by FDM
Different groups within group WUS are identified by sequence-based group indication (single sequence CDM or SS-CDM)
If more than one group needs to be awoken, a common WUS is used Furthermore, it has been identified that UE power consumption may greatly benefit from mobile UEs being separated from stationary UEs. One solution is to let a mobile UE, i.e., a UE waking up in a different cell from its last known cell, search for a different WUS sequence compared to stationary UEs. A more detailed analysis of the false paging rate for the mobile UE case follows in Sec. 2.2. to the list above the following use case is then added:
Mobile and stationary UEs are differentiated with different WUS sequences Table 1 summarizes the different WUS alternatives that are transmitted for the different scenarios presented above. In order to indicate that signals are transmitted on different (frequency) resource sets, the parameters RSLegacy and RSGroup are introduced. As is seen in the table, a legacy WUS is transmitted in the legacy resource set in case a legacy WS is paged and a group WUS is transmitted in the group WUS resource set if a group WUS UE is paged. Furthermore, if UEs belonging to more than one UE group are paged, a common WUS is transmitted in the group WUS resource set. If also a legacy UE is paged simultaneously, a legacy WUS is also transmitted. Finally, a mobile UE, i.e., a UE camping on another cell than its last known cell, is paged by a special mobile group WUS, in order for stationary UEs not to be awoken. A consequence of this approach is that a group WUS UE would be required to detect two sequences which should be quite feasible.

TABLE 1

Relation between paging set and transmitted group WUS sequence.

| Paged UE(s) | Transmitted WUS |
| --- | --- |
| Legacy WUS UEs | Legacy WUS in $RS_{Legacy}$ |
| UEs in group i of group WUS | Group WUS i in $RS_{Group}$ |
| UEs in >1 group of group WUS | Common WUS in $RS_{Group}$ |
| All WUS UEs | Legacy WUS in $RS_{Legacy}$ |
|  | Common WUS in $RS_{Group}$ |
| Mobile group WUS UEs | Mobile group WUS in $RS_{Group'}$ |

There is a benefit in designing a group WUS with a large number of groups in order to achieve a low false paging rate for the stationary case, i.e., where no paging escalation was considered. For all reasonable paging rates, a large number of groups achieves the smallest false paging rate assuming a sequence-based group indication (SS-CDM) where the UE attempts to detect both a common WUS and a group WUS. Taking also mobility into account, i.e., a mobile UE is being paged throughout multiple cells, the problem with false paging is severely worse, for example when a tracking area (TA) of 100 cells is assumed, implying that a single mobile UE may cause the whole TA to wake up. The false paging rate for a mobile case is approximately two magnitudes worse for this case compared with a stationary case. Thus, the advantages with a large number of groups becomes even greater. It may of course be argued that paging a mobile UE is a relatively rare event. However, it is sufficient that a single mobile UE needs to be paged in order for some paging escalation to be required, and the consequences of that is an increased paging rate of several magnitudes.

It may be noticed that paging escalation due to UE mobility may be a major contributor to false pages since it affects UEs in multiple cells. According to an example, the number of UE groups should be an evaluation criterion for group WUS multiplexing.

A simple way to limit the problems with mobile UEs and their effect on false pages is to separate them from stationary UEs. In that way, UEs that are camping in a different cell from their last known cell would be attentive to a separate WUS group, whereas stationary UEs would largely be unaffected by a page to such UEs.

The different multiplexing alternatives may be assessed with regards to:
  UE power consumption, and
  Network paging capacity The above parameters may be assessed and based on those assessments, preferred multiplexing schemes are determined. Here it is worth noting that the number of UE groups that are allowed with the different schemes varies, bringing about secondary effects in terms of varying false paging rates that should also be taken into account for the different alternatives.

Several arguments of the negative consequences that a TDMed WUS may bring about may be put forward. A detailed analysis is provided how a TDMed WUS will affect the flexibility and configurability of WUS, incapacitating some of the flexibility that was introduced in Rel-15, as well as how paging capacity can be expected to be decreased from the time multiplexing.

When discussing a possible TDMing of WUSs (either among groups within group WUS or between legacy and group WUS), it is worth noting that Rel-15 WUS already contains a TDM component in that DRX and eDRX UEs may be allocated to different gap lengths, e.g. 40, 80, 160 or 240 ms. Furthermore, an additional, optional gap length of 1 or 2 s may be defined for eDRX. Hence, when designing the group WUS, it is desirable to keep this functionality and to not restrict the flexibility it brings about more than necessary. It is also worth noting that the benefits of WUS increase as UE coverage decrease, i.e., the lower the SNR at the UE, the more it will benefit from using WUS. With respect to this, Table 2 presents the feasible DRX and eDRX gap combinations for the 1 TDM (i.e., no TDM), 2 TDM and 4 TDM cases for a given number of WUS repetitions.

TABLE 2

Feasible combinations of DRX and eDRX gap lengths for different TDM levels in powers of 2 s.

| | | Maximum number of WUS repetitions | | | | | |
|---|---|---|---|---|---|---|---|
| | | 16 | 32 | 64 | 128 | 256 | 512 |
| eDRX and | 40 | 2 | 1 | 0 | 0 | 0 | 0 |
| DRX gap | 80 | 4 | 2 | 1 | 0 | 0 | 0 |
| differences | 120 | 7 | 3 | 1 | 0 | 0 | 0 |
| [ms] | 160 | 10 | 5 | 2 | 1 | 0 | 0 |
| | 200 | >10 | 6 | 3 | 1 | 0 | 0 |

TDM may unnecessarily restrict the number of usable DRX and eDRX gap combinations. The disadvantages with TDM increase with the number of repetitions, i.e., the cost of TDM is the highest when the benefit of WUS is the greatest.

Additionally, the TDM will occupy more resources in a manner that restricts paging capacity. Assuming a WUS duration of 32 SFs, which is in the high range for MTC but in the medium range for NB-IoT, further assuming that each frame is a paging frame, the number of blocked POs will increase due to the TDM. Table 3 presents the effect of this where it is clearly shown that the paging capacity is linear with the order of time multiplexing, resulting in a drastically reduced paging capacity. A decreased paging capacity should be avoided unless no alternatives exist. Fortunately, they do in FDM and/or SS-CDM.

TABLE 3

Number of blocked POs for a 32 SF WUS.

| | | # TDMed WUSs | | |
|---|---|---|---|---|
| | | 1 | 2 | 4 |
| POs per | 1 | 3 | 6 | 13 |
| paging | 2 | 6 | 12 | 25 |
| frame | 4 | 12 | 25 | 50 |

TDM may severely restrict the network paging capacity. For LTE-MTC, it is possible to FDM three simultaneous WUSs within one narrowband and thereby avoid further blocking of other signals and channels also competing for resources. The mentioned drawbacks of this scheme are mainly that boosting parallel WUSs will require power redistribution from outside the narrowband. Considering the rare occurrence of such events, it is not a valid concern. Hence, FDM may provide all advantages in terms of separating different WUSs as TDM does but without any of its disadvantages in terms of reduced network capacity. FDM does not reduce network capacity like TDM does.

A second evaluation parameter for the different multiplexing alternatives is the UE power performance. Considering the conclusions from above that a solution with many UE groups should be selected implies including CDM in some way. Pure TDM and FDM are feasible only for multiplexing between legacy WUS and group WUS but not for within groups since neither of the two allows for a sufficient number of groups. The main differences between the different alternatives regarding power consumption are identified below.

TDM will provide an increased UE power consumption due to the longer light sleep period that would be required, affecting mainly eDRX performance if used for multiplexing between legacy and group WUS. If TDM is used to multiplex among different UE groups an increased false paging rate would substantially add to the UE power consumption due to the small number of groups that are feasible.

FDM will result in unchanged UE power when used as a multiplexing technique between legacy and group WUS. If used for multiplexing between UE groups, FDM would suffer from the same limitations in the number of UE groups resulting in an increased false paging rate.

SS-CDM will result in a decreased UE power consumption mainly arising from a reduced false paging rate since it allows substantially more UE groups. A slight increase in power will arise from the requirement of the UE to detect two sequences, which the agreed UE power consumption model does not account for.

SS-CDM+TDM will bring the same benefits as SS-CDM, with further UE power decrease due to fewer UEs sharing the same resource set, reducing the false paging rate further. On the other hand, it also brings the same drawbacks as TDM in that the sleep pattern will change, increasing UE power consumption.

SS-CDM+FDM will bring the same benefits as SS-CDM as well as further increase UE power performance due to fewer UEs sharing the same resource set.

The above evaluations are summarized in Table 4. From the table it is evident that the single sequence CDM provides substantial advantages to the other alternatives. If needed it can be combined with FDM, e.g., when multiplexing between legacy WUS and group WUS, but also within group WUS if necessary.

TABLE 4

Performance summary of the multiplexing alternatives.

| Multiplexing method | Sleep pattern | False pages | WUS configurability | Paging capacity |
|---|---|---|---|---|
| TDM | − − | − − | − − − | − − − |
| FDM/carrier mux | 0 | − − | 0 | 0 |
| SS-CDM | 0 | + + | 0 | 0 |
| SS-CDM + TDM | − | + + + | 0 | − − |
| SS-CDM + FDM | 0 | + + + | 0 | 0 |

FDM may be used to separate legacy WUS from group WUS in LTE-MTC. Sequence-based group indication (single sequence CDM) may be used for multiplexing between UE groups.

The following group-WUS designs has been evaluated:

Cycled frequency domain orthogonal cover codes where the cycle start position indicates the group. Cover codes results in a total of 12 groups, of which one may be the legacy WUS. Below it is labelled as "TF-OCC12".

Shifted scrambling sequence where the shift index indicates the group. Two alternatives are studied:

Shift increment 264, labelled "SCRS 264" below.

Shift increment 1031, labelled "SCRS 1031" below, implemented to avoid WUS mix-ups.

This method may be limited to 36 groups, which is deemed sufficient for all practical reasons.

Phase shift progression with 2*pi/132 increment quanta, where the phase increment indicates the group. Due to deterministic, strong cross-correlation, in addition to the original proposal in 3GPP contribution R1-1812133, "UE-group wake up signal," Huawei, RAN1 #95, Spokane, USA, November 2018, two additional alternatives are also studied:

A dense set of increments allowing up to 131 groups (only 45 groups were studied), labelled "DELTA 132" below.

Increments of five, i.e., 0, 5, 10, . . . , resulting in 27 groups and labelled "DELTA 1325" below.

A dual series of every seventh increment, 0, 7, 14, . . . and 2, 9, 16, . . . resulting in 36 groups and labelled "DELTA $132_{72}$" below.

Regarding implementation complexity, the following observations may be made:

The wake-up receiver is expected to be set up for detecting a few sequences. The sequences are expected to be calculated off-line, which makes implementation complexity a minor issue. None of the approaches have implementation complexity that would stop their adoption.

The phase shift progression design is the most complex, requiring 264 additional complex multiplications in the calculation of the sequence.

While scrambling sequence shift involves shifting two long PRB sequences, methods exist for rapid calculation of PRB generator states. Since this is also part of the coding and decoding of PDSCH, UE designs are expected to include hardware accelerators for this purpose.

Applying the OCC12 code amounts to 132 sign changes.

All investigated group WUS sequence candidates have a sufficiently small complexity to be considered for group WUS.

For WUS durations greater than 1 SF, it can be observed that shifting the scrambling sequence in increments of 264 results in time-shifted match, i.e. the WUS sequence for one group is the same as for other groups, only occurring k subframes earlier. To avoid this, it is proposed to shift the scrambling sequence in increments of 1031 (or 2062, to avoid odd number), which eliminate such matches for durations up to 1024 subframes.

It can also be observed that scrambling sequence shift allows practically unlimited number of groups. However, it is, for practical reasons, here chosen to limit evaluation to 35 groups.

The candidate designs have been simulated under the following conditions:

1.92 Msps 128-pt FFT 24 subcarrier WUS 21 sample reception window

40 Hz frequency error

EPA Channel model with 1 Hz doppler 10000 instances per Rx/Tx group pairing

Coherent combination within subframes

Non-coherent combining (i.e. power) of subframes

A handful of Cell ID values

The result of the simulations is illustrated with plots of the overall cumulative distribution (CDF) of the maximum correlation values within a detection time window. The CDF traces are normalized against the 99-percentile of the correlation against white noise (i.e., 1% false-alarm probability for AWGN).

Considering performance for repetition level 4, corresponding to an SNR level of −12.5 dB, the following observations can be made:

TF-OCC12 results in cross-group false-alarm rate in the range of 6% to 8%, when white-noise false-alarm rate is 1%.

SCRS264 and SCRS1031 yields randomly scattered group combinations that overall exhibit consistently higher false-alarm probability than white noise, approximately the same as for TF-OCC12.

DELTA132 result in 4.5% cross-group false-alarm rate, caused by distinct group combinations giving a certain false-alarm rate making it an unviable solution. The group combinations are the same across the tested Cell IDs.

DELTA1325 and DELTA13272 result in overall cross-group false-alarm rate being comparable to white noise at repetition level 4. Some group combinations give systematically higher false-alarm probability, independent of Cell ID. However, the resulting cross-correlation is manageable.

Considering performance for repetition level 1, corresponding to an SNR level of 2.5 dB for one alternative per method. Results for the others are in line with the ones presented below. At repetition level 1 the operating SNR is higher, which makes the cross-group correlation stand out from the noise. It can be noted that:

Using the white noise threshold for 1% false-alarm rate yield roughly 26% cross-group false-alarms with TF-OCC12, 20% with SCRS1032 and 2% with DELTA132$_{72}$.

For DELTA132$_{72}$, the raised false-alarm probability is caused by a few systematic cross-group combinations having considerably higher false-alarm probability. An even lower false alarm probability can be obtained by further restricting the groups.

Based on these findings, DELTA132$_{72}$ may be considered for adoption. It allows 35 groups, plus legacy group with good cross-group false-alarm probability. However, depending on the number of groups needed and false-alarm requirements, a more restrictive set of phase shift progressions may be considered. A subset of phase shift progression of 2*pi/132 increment quanta may be used as grouping discriminator, e.g., dual series phase increment of every 7th (0, 7, 14, ...) (2, 9, 16, ...) "DELTA132$_{72}$".

The invention claimed is:

1. A wireless communication device arranged to operate in a cellular communication system, the wireless communication device comprising:
    a receiver configured to receive radio signals from a radio access network node of the cellular communication system;
    a signal detector configured to detect a first signal and a second signal among the signals received from the access network node of the cellular communication system, the first signal comprising a network synchronisation signal comprising information about synchronisation and an identification of a cell associated with the access network node, and the second signal comprising a notification; and
    a controller configured to cause the signal detector to one of:
        detect a notification of a first type when the received identification of the cell is equal to a previous reception of an identification of a cell at a last mutual interaction between the wireless communication device and the cellular communication system,
        and detect a notification of a second type when the received identification of the cell differs from the previous reception of the identification of the cell at the last mutual interaction between the wireless communication device and the cellular communication system.

2. The wireless communication device of claim 1, wherein when the identification of the cell which the notification is received from is equal to the identification of the cell at the last mutual interaction between the wireless communication device and the cellular communication system, a first radio network temporary identifier (RNTI) is used for notification reception, and when the identification of the cell which the notification is received from is different from the identification of the cell at the last mutual interaction between the wireless communication device and the cellular communication system a second RNTI is used for the notification reception.

3. The wireless communication device of claim 1, wherein the notification includes a wake-up signal indicating that a paging signal be read from the received signals.

4. The wireless communication device of claim 1, wherein the notification includes a paging signal.

5. The wireless communication device of claim 1, wherein the signal detector comprises a correlator for detecting the second signal, and the notification of the first type comprises a sequence having low correlation with a sequence of the notification of the second type.

6. The wireless communication device of claim 1, wherein the first and second types of notifications are differentiated by different code words of a paging radio network temporary identifier.

7. The wireless communication device of claim 1, wherein the notification is received on a first frequency when the identification of the cell which the notification is received from is equal to the identification of the cell at the last mutual interaction between the wireless communication device and the cellular communication system, and received on a second frequency when the identification of the cell which the notification is received from is different from the identification of the cell at the last mutual interaction between the wireless communication device and the cellular communication system, wherein the second frequency is determined by a EUTRA (Evolved UMTS (Universal Mobile Telecommunications System) Terrestrial Radio Access) Absolute Radio Frequency Channel Number (EARFCN).

8. A method of a wireless communication device which is arranged to operate in a cellular communication system, the method comprising:
    receiving radio signals from a radio access network node of the cellular communication system; and
    detecting a first signal and a second signal among the signals received from the access network node of the cellular communication system, the first signal comprising a network synchronisation signal comprising information about synchronisation and an identification of a cell associated with the access network node, and the second signal comprising a notification, the detecting of the notification comprising one of:
        detecting a notification of a first type when the received identification of the cell is equal to a previous reception of an identification of a cell at a last mutual interaction between the wireless communication device and the cellular communication system; and
        detecting a notification of a second type when the received identification of the cell differs from the previous reception of the identification of the cell at the last mutual interaction between the wireless communication device and the cellular communication system.

9. The method of claim 8, wherein when the identification of the cell which the notification is received from is equal to the identification of the cell at the last mutual interaction between the wireless communication device and the cellular communication system, a first radio network temporary identifier (RNTI) is used for the notification reception, and when the identification of the cell which the notification is received from is different from the identification of the cell at the last mutual interaction between the wireless communication device and the cellular communication system a second RNTI is used for the notification reception.

10. The method of claim 8, wherein the notification includes a wake-up signal indicating that a paging signal be read from the received signals.

11. The method of claim 8, wherein the notification includes a paging signal.

12. The method of claim 8, wherein the detecting comprises correlating the second signal with a sequence for applicable type of notification, wherein the notification of the first type comprises a sequence having low correlation with a sequence of the notification of the second type.

13. The method of claim 8, wherein the first and second types of notifications are differentiated by different code words of a paging radio network temporary identifier.

14. The method of claim 8, wherein the notification is received on a first frequency when the identification of the cell which the notification is received from is equal to the identification of the cell at the last mutual interaction between the wireless communication device and the cellular communication system, and received on a second frequency when the identification of the cell which the notification is received from is different from the identification of the cell at the last mutual interaction between the wireless communication device and the cellular communication system, the method comprising determining the second frequency from a EUTRA (Evolved UMTS (Universal Mobile Telecommunications System) Terrestrial Radio Access) Absolute Radio Frequency Channel Number (EARFCN).

15. A radio access network node arranged to operate in a cellular communication system, the radio access network node comprising:
an interface towards the cellular communication system;
a transceiver configured to interact by radio signals, comprising a first signal and a second signal to be transmitted, with one or more wireless communication devices, the first signal comprising a network synchronisation signal comprising information about synchronisation and an identification of a cell associated with the radio access network node, and the second signal comprising a notification; and
a controller configured to:
determine, from a paging message for a wireless device received over the interface, a last identification of a cell to which the wireless device had a last mutual interaction between the wireless communication device and the cellular communication system; and
form the notification to be one of:
a first type when the determined identification of the cell is equal to an identification of a cell operated by the radio access network node; and
a second type when the determined identification of the cell differs from the identification of the cell operated by the radio access network node.

16. The radio access network node of claim 15, wherein when the identification of the cell is equal to the identification of the cell operated by the radio access network node, a first radio network temporary identifier (RNTI) is used for notification transmission, and when the identification of the cell is different from the identification of the cell operated by the radio access network node, a second RNTI is used for the notification transmission.

17. The radio access network node of claim 15, wherein the notification includes a wake-up signal indicating that a paging signal be read from the transmitted signals.

18. The radio access network node of claim 15, wherein the notification includes a paging signal.

19. The radio access network node of claim 15, wherein the notification of the first type comprises a sequence having low correlation with a sequence of the notification of the second type.

20. The radio access network node of claim 15, wherein the first and second types of notifications are differentiated by different code words of a paging radio network temporary identifier.

21. The radio access network node of claim 15, wherein the notification is transmitted on a first frequency when the identification of the cell is equal to the identification of the cell operated by the radio access network node, and transmitted on a second frequency when the identification of the cell is different from the identification of the cell operated by the radio access network node, wherein the second frequency is determined by a EUTRA (Evolved UMTS (Universal Mobile Telecommunications System) Terrestrial Radio Access) Absolute Radio Frequency Channel Number (EARFCN).

22. A method of a radio access network node which is arranged to operate in a cellular communication system, the method comprising:
receiving a paging message for a wireless device from another node of the cellular communication system;
determining, from the paging message a last identification of a cell to which the wireless device had a last mutual interaction between the wireless communication device and the cellular communication system; and
transmitting a first signal and a second signal, the first signal comprising a network synchronisation signal comprising information about synchronisation and an identification of a cell associated with the radio access network node, and the second signal comprising a notification, the notification is one of:
a first type when the determined identification of the cell is equal to an identification of a cell operated by the radio access network node; and
a second type when the determined identification of the cell differs from the identification of the cell operated by the radio access network node.

23. The method of claim 22, wherein when the identification of the cell is equal to the identification of the cell operated by the radio access network node, a first radio network temporary identifier (RNTI) is used for notification transmission, and when the identification of the cell is different from the identification of the cell operated by the radio access network node, a second RNTI is used for the notification transmission.

24. The method of claim 22, wherein the notification includes a wake-up signal indicating that a paging signal should be read from the transmitted signals.

25. The method of claim 22, wherein the notification includes a paging signal.

26. The method of claim 22, wherein the notification of the first type comprises a sequence having low correlation with a sequence of the notification of the second type.

27. The method of claim 22, wherein the first and second types of notifications are differentiated by different code words of a paging radio network temporary identifier.

28. The method of claim 22, wherein the notification is transmitted on a first frequency when the identification of the cell is equal to the identification of the cell operated by the radio access network node, and transmitted on a second frequency when the identification of the cell is different from the identification of the cell operated by the radio access network node, wherein the second frequency is determined by a EUTRA (Evolved UMTS (Universal Mobile Telecommunications System) Terrestrial Radio Access) Absolute Radio Frequency Channel Number (EARFCN).

* * * * *